United States Patent [19]

Kolchinsky

[11] Patent Number: 5,301,344
[45] Date of Patent: Apr. 5, 1994

[54] MULTIBUS SEQUENTIAL PROCESSOR TO PERFORM IN PARALLEL A PLURALITY OF RECONFIGURABLE LOGIC OPERATIONS ON A PLURALITY OF DATA SETS

[75] Inventor: Alexander Kolchinsky, Andover, Mass.

[73] Assignee: Analogic Corporation, Peabody, Mass.

[21] Appl. No.: 647,557

[22] Filed: Jan. 29, 1991

[51] Int. Cl.$^5$ ............................................. G06F 13/00
[52] U.S. Cl. ............................ 395/800; 364/DIG. 1; 364/229.4; 364/254.1; 364/254.2; 364/254.3
[58] Field of Search ................................. 395/800, 165

[56] References Cited

U.S. PATENT DOCUMENTS

| | | | |
|---|---|---|---|
| 4,590,557 | 5/1986 | Lillie | 395/700 |
| 4,604,690 | 8/1986 | Crabtree et al. | 395/700 |
| 4,747,070 | 5/1988 | Triottier et al. | 395/165 |
| 4,761,755 | 8/1988 | Ardini, Jr. et al. | 364/749 |
| 5,014,193 | 5/1991 | Garner et al. | 395/275 |
| 5,109,503 | 4/1992 | Cruickshank et al. | 395/500 |
| 5,125,081 | 6/1992 | Chiba | 395/325 |
| 5,142,469 | 8/1992 | Weisenborn | 364/146 |

Primary Examiner—Parshotam S. Lall
Assistant Examiner—Krisna Lim
Attorney, Agent, or Firm—Joseph S. Iandiorio

[57] ABSTRACT

A reconfigurable sequential processor includes a data bank for storing data to be processed; a programmable logic block address generator for addressing data in the data bank; a programmable logic block arithmetic unit responsive to the data bank for processing the data addressed by the programmable logic block address generator; an address generator hardware configuration file having a plurality of configuration files for configuring the programmable logic block address generator in one of a plurality of addressing configurations in response to an address operational code; an arithmetic hardware configuration file having a plurality of configuration files for configuring the programmable logic block arithmetic unit in one of a plurality of processing configurations in response to an arithmetic operational code; and for delivering a series of operational codes to each configuration file for enabling the programmable logic block address generator and the programmable logic block arithmetic unit to be configured to perform sequentially a corresponding series of arithmetic logic operations on the data in the data bank.

5 Claims, 8 Drawing Sheets

| 74 OPCODE | FILE NAME 72 | |
|---|---|---|
| 0000 | IMAGE ACQUISITION | 16 Kbytes |
| 0001 | SPATIAL FILTERING | 16 Kbytes |
| 0010 | HISTOGRAM OPERATIONS | 16 Kbytes |
| 0011 | IMAGE WINDOWING | 16 Kbytes |
| 0100 | ZOOMING/PANNING | 16 Kbytes |
| 0101 | FEATURE EXTRACTION | 16 Kbytes |
| 0110 | GEOMETRIC TRANSFORM | 16 Kbytes |
| 0111 | SEGMENTATION | 16 Kbytes |
| 1000 | EROSION/DILATION | 16 Kbytes |
| 1001 | SHAPE ANALYSIS | 16 Kbytes |
| 1010 | IMAGE COMPRESSION | 16 Kbytes |
| 1011 | TEMPORAL FILTERING | 16 Kbytes |
| 1100 | THREE DIMENSIONAL | 16 Kbytes |
| 1101 | COLOR PROCESSING | 16 Kbytes |
| 1110 | GRAPHIC OVERLAY | 16 Kbytes |
| 1111 | IMAGE DISPLAY | 16 Kbytes |

MULTIBUS SEQUENTIAL PROCESSOR TO PERFORM IN PARALLEL A PLURALITY OF RECONFIGURABLE LOGIC OPERATIONS ON A PLURALITY OF DATA SETS

FIELD OF INVENTION

This invention relates to a reconfigurable sequential processor, and more particularly to such a processor which is reconfigurable over time to implement a series of address generators and arithmetic logic units for performing a corresponding sequence of operations on data.

BACKGROUND OF INVENTION

Conventional data processing systems such as image data processors require extensive hardware to perform a series of arithmetic logic operations on the data. For example, image data requires the operations of image acquisition, spatial filtering, temporal filtering, histogram equalization, image display, to name just a few. Each such operation requires a separate hardware implementation in separate boards or separate gate arrays. Such implementations are expensive and are relatively inefficient in the sense that while all the necessary hardware is always present it is being utilized only a small part of the time during the period when its particular operation in the series is called for. The hardware actually involves two components: an address generator for selecting the pixel addresses in the sequence called for by the operation, and an arithmetic logic unit, which actually performs the operation on the sequenced data.

The escalation of hardware required is even greater in pipeline systems, which feature fixed image data banks. A pipeline system is one in which a number of image processing operations are being performed on a number of different frames of pixels as the frames are shifted through the pipeline or a series of processors. In one variety of pipeline system where the image data is fixed and does not move through the pipeline, each frame must be serviced by a sequence of address generators and associated arithmetic logic units; that requires two large multiplexer switches with massive switching capability to connect the right pair of address generators and arithmetic logic units to each frame in the proper sequence.

SUMMARY OF INVENTION

It is therefore an object of this invention to provide a reconfigurable sequential processor.

It is a further object of this invention to provide such a reconfigurable sequential processor whose reconfiguration is controlled by software.

It is a further object of this invention to provide such a reconfigurable sequential processor which uses the same gate arrays reconfigurable in time to implement specific generators and arithmetic logic units, respectively, in a number of different sequential operations on the same data.

It is a further object of this invention to provide such a reconfigurable sequential processor which provides the simultaneous processing available in pipeline systems with stationary data banks yet eliminates the need for massive multiplexer switching capability.

It is a further object of this invention to provide such a reconfigurable sequential processor in which the processing algorithm can be changed easily and quickly without hardware replacement.

The invention results from the realization that a truly effective and economical data processor can be achieved by using an address generator and an arithmetic unit which can be easily reconfigured under software control to emulate a number of different address sequences and arithmetic operations, respectively, using the same programmable logic blocks.

This invention features a reconfigurable sequential processor including a data bank for storing data to be processed and a programmable logic block address generator for addressing data in a data bank. A programmable logic block arithmetic unit responds to the data bank for processing the data addressed by the programmable logic block address generator. An address generator hardware configuration file has a plurality of configuration files for configuring the programmable logic block address generator in one of a plurality of address configurations in response to an address operational code. An arithmetic hardware configuration file has a plurality of configuration files for configuring the programmable logic block arithmetic unit in one of a plurality of processing configurations in response to an arithmetic operational code. There are for delivering a series of operational codes to each configuration file for enabling the programmable logic block address generator and the programmable logic block arithmetic unit to be configured to perform sequentially a corresponding series of arithmetic logic operations on the data in the data bank.

In a preferred embodiment the programmable logic blocks are programmable gate arrays. The for delivering operational codes may include an operational code register for storing the operational code in the next configuration for each of the logic blocks and decoder responsive to the next operational code for selecting from the hardware configuration files the file corresponding to that operational code. The address generator may include a plurality of reconfigurable address sets and the arithmetic unit may include a plurality of reconfigurable arithmetic circuits. The data bank may include a plurality of sets of data and the reconfigurable sequential processor may further include a plurality of buses for interconnecting each of the address sets and arithmetic units for the corresponding one of the data sets.

BRIEF DESCRIPTION OF THE DRAWINGS

Other objects, features and advantages will occur to those skilled in the art from the following description of a preferred embodiment and the accompanying drawings, in which.

DESCRIPTION OF THE PREFERRED EMBODIMENT

Figure 1:
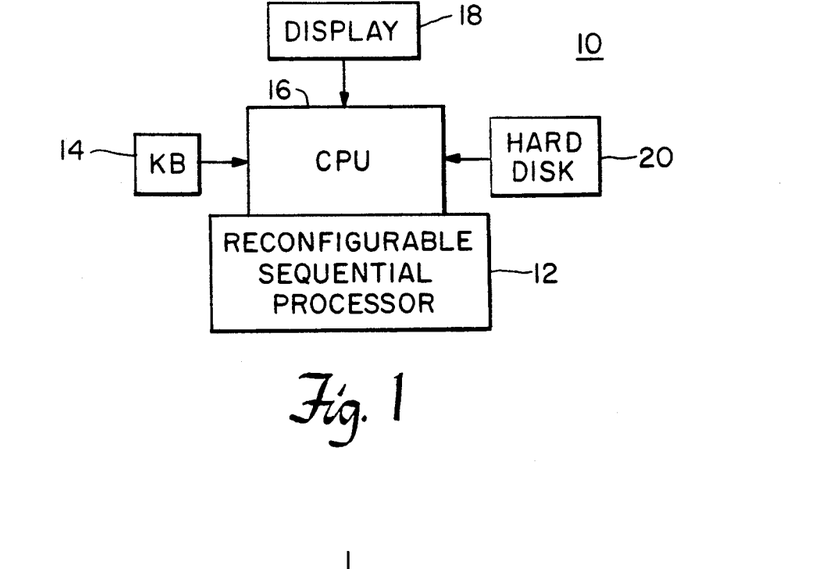
FIG. 1 is a block diagram of a computer containing the reconfigurable sequential processor according to this invention.

There is shown in FIG. 1 a computer system 10 including a reconfigurable sequential processor 12 according to this invention. The computer may be an IBM PC or any other computer having a keyboard 14, CPU 16, display 18, and a hard disk storage 20 or any other suitable permanent storage. The reconfigurable sequential processor 12 and CPU 16 typically form plug-in boards on a common backplane in a computer.

Figure 2:
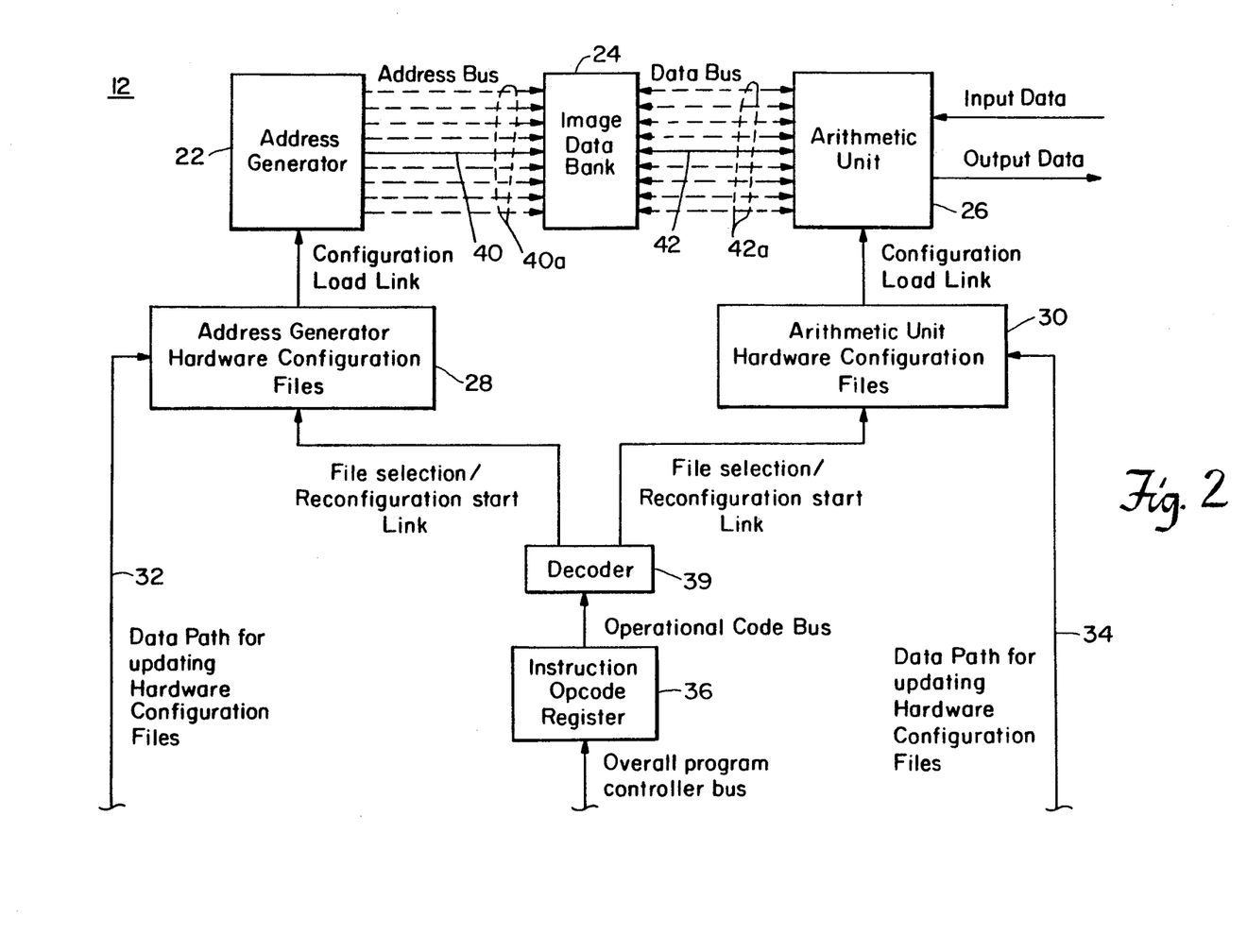
FIG. 2 is a more detailed block diagram of the reconfigurable sequential processor of FIG. 1 according to this invention.

Reconfigurable sequential processor 12, FIG. 2, includes address generator 22 which selects a sequence of addresses from image data bank 24 that are to be delivered to arithmetic unit 26 one at a time for processing and then returned to image data bank 24. The particular operation being performed may be an image acquisition, spatial filtering, histogram, or image display. In each case address generator 22, which is implemented by a programmable logic block such as a programmable gate array, is configured by a file selected from the hardware configuration file circuit 28. In like manner, arithmetic unit 26, which is also implemented by a programmable logic block such as a programmable gate array, is configured according to a file selected from hardware configuration files 30. Each of the configuration files 28 and 30 are loaded initially with a plurality of files such as from hard disk 20 on lines 32 and 34. Subsequently, when an operational code identifying a particular process arrives at the instruction operational code register 36 on line 38 from the CPU 16, decoder 39 is enabled to order one or both of the hardware configuration files to introduce the desired file into the respective units, address generator 22 and arithmetic unit 26.

Although only one address bus 40 and one data bus 42 are shown in FIG. 2, this is not a necessary limitation of the invention. For example, a plurality of address buses 40a and a plurality of data buses 42a (shown in phantom) may be used when address generator 22 includes a plurality of address sets; image data bank 24 includes a plurality of data sets and arithmetic unit 26 includes a plurality of arithmetic circuits. In that case each address set in address generator 22 acts as an independent address generator and produces a specific sequence of addresses to the corresponding data set in image data bank 24. The data from memory locations specified by that sequence of addresses is processed by a corresponding arithmetic circuit in arithmetic unit 26. Each of these combinations of address set, data set and arithmetic circuits are interconnected by one of the plurality of buses shown, so that simultaneous pipeline-like processing can be accomplished. In addition, after the pipeline cycle of processing is completed the personalities or identities of the address sets can be reshuffled, as can the personalities or identities of the arithmetic circuits in arithmetic unit 26, so that a new cycle of image processing can be applied to the data sets in the image data bank 24, which has not been reshuffled, all of this being done without requirement for any complex bus multiplexing.

Figure 3:
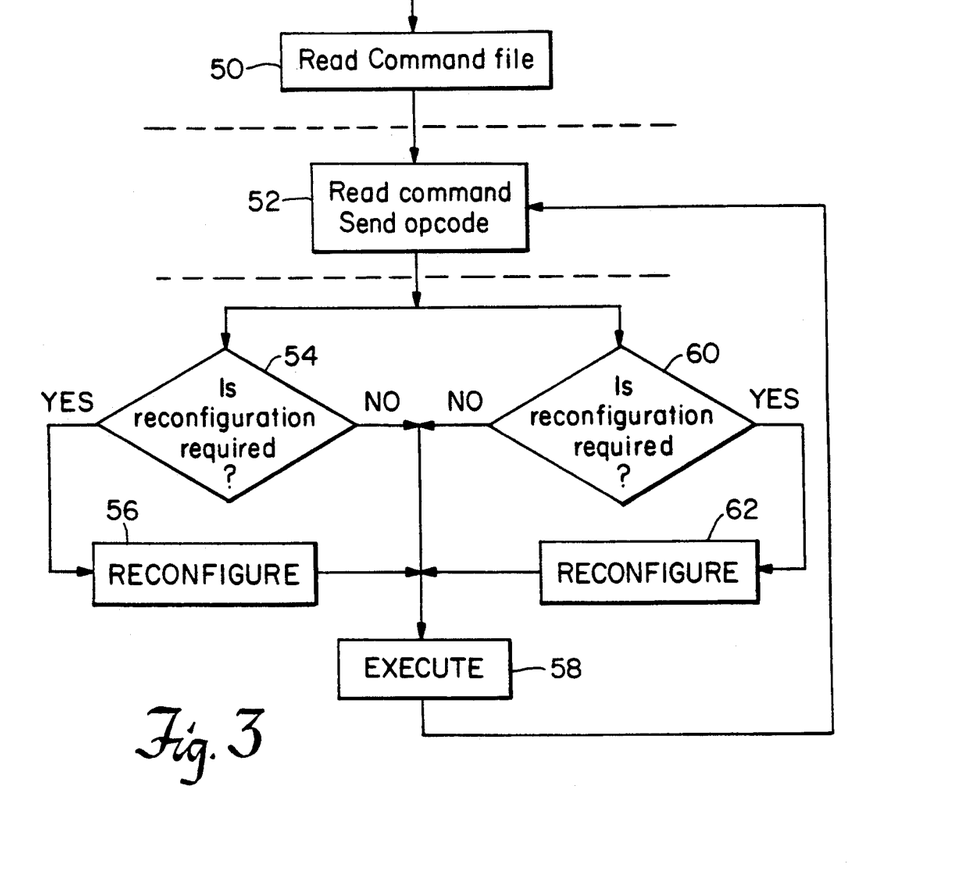
FIG. 3 is a flow chart showing the routine which effects the reconfiguration of the processor shown in FIG. 2.

All of the configuration files necessary for a particular processing effort may be preliminarily stored in address generator hardware configuration files 28 and arithmetic unit hardware configuration files 30, from, for example, hard disk 20 over lines 32 and 34, respectively. Or, each individual file may be supplied from hard disk 20 over lines 32 and 34 to their respective files 28 and 30 individually as they are needed. In either case, computer 10 reads from the command file, step 50, the next processing technique that is to be executed: for example, image acquisition, spatial filtering, histogram operation, or the like. In consequence, it identifies the operational code of the specific configuration required for that processing effort and places it, step 52, in instruction operational code register 36, FIG. 2. Following this, decoder 39, FIG. 2, functions to drive both configuration files 28 and 30. In step 54, FIG. 3, decoder 39 asks, "Is reconfiguration required of the address generator files?" If the answer is yes, it reconfigures the address generator file in step 56 and then executes in step 58. If the response is no, because, for example, the same configuration is required again, the system moves directly to execute in step 58. Simultaneously, decoder 39 in step 60 is asking the question, "Is reconfiguration required with respect to the arithmetic unit hardware configuration files 30?" If the answer is yes, that file is reconfigured in step 32 and the system moves to execute in step 58. If the response is negative, the system moves directly to the execution step 58. Note however that execution in step 58 will not take place unless a decision has been made in both step 54 and step 60 indicating that the necessary reconfiguration, if any, has been effected in both files. After execution is complete, the system recycles to look for the next operational code in step 52, which is stored in the instruction operational code register 36 in response to the next command read in step 50 from the computer 10.

Figure 4:
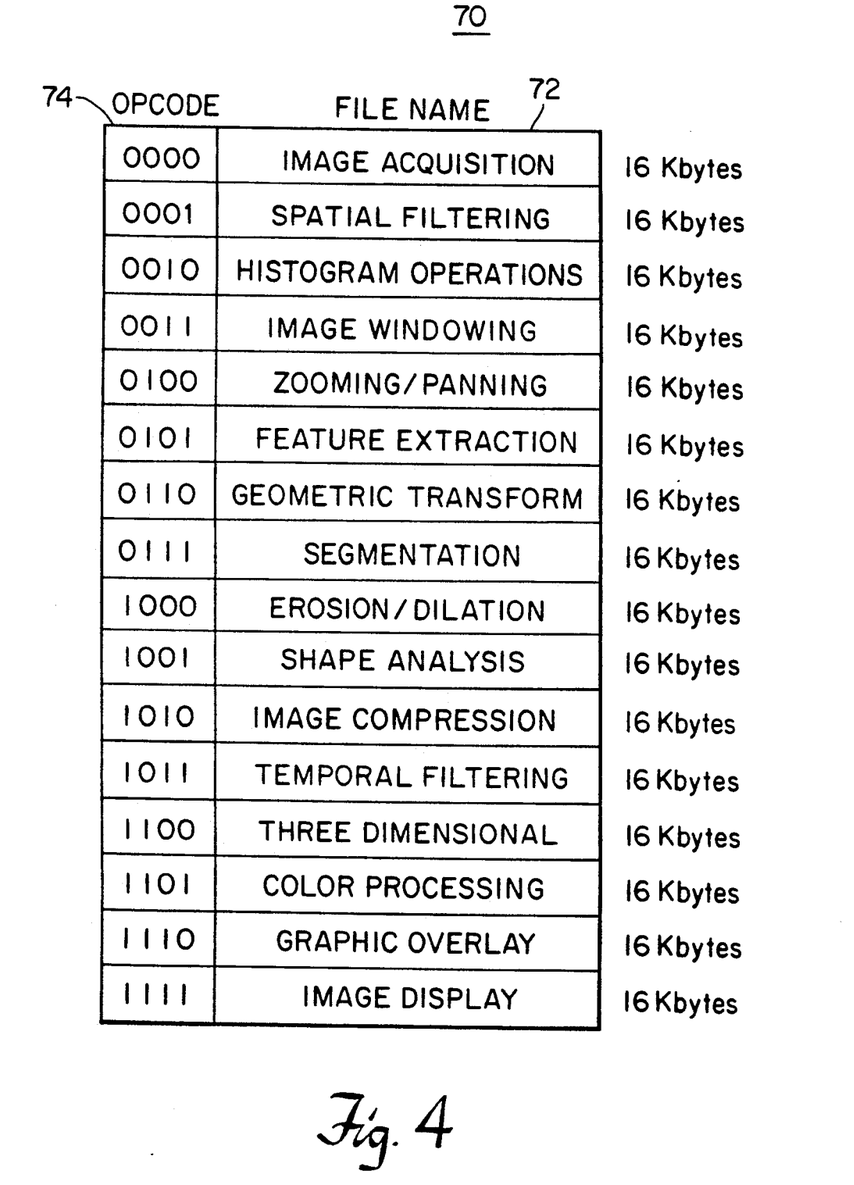
FIG. 4 is a list of the various hardware configuration files and the respective operational codes that can be configured in the processor according to this invention.

A typical list 70 of available processes for which the system may be reconfigured and the associated operational codes are shown in FIG. 4, where the table includes sixteen different file names identified under the File Name column 72 having corresponding operational codes tabulated in the Operational code column 74. Each of the files has a field available of 16 kbytes and there are sixteen different files in all, from image acquisition to image display. The hardware configuration files could be RAM based or PROM based. In this case, where there are sixteen files of sixteen kbytes each, the storage necessarily has a capacity of 256 kbytes. If the block is RAM based it can be reloaded with new files periodically. This feature makes possible the use of a library of functions limited only by the size of the permanent storage, e.g., the hard disk.

Figure 5:
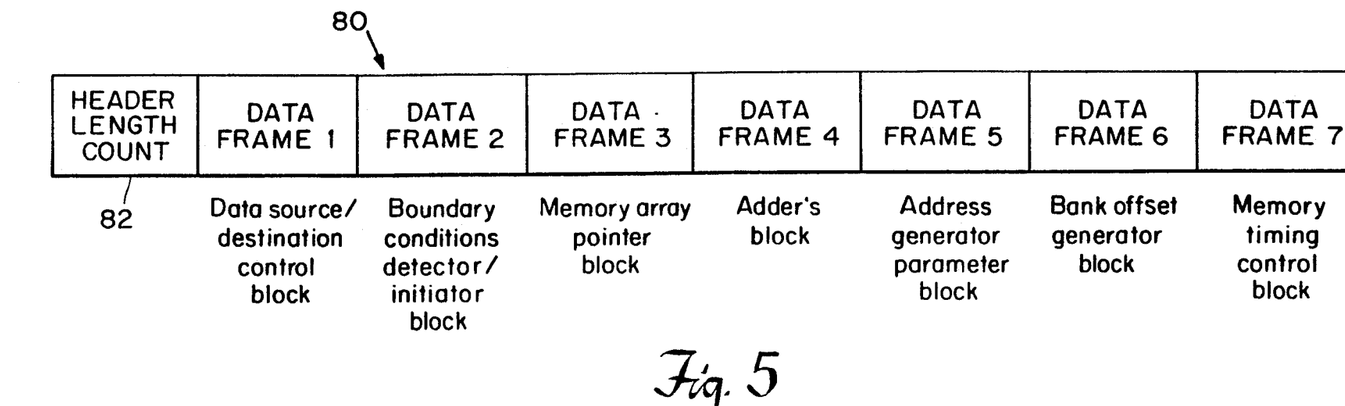
FIG. 5 is a diagram of the file structure for the address generator configuration files in FIG. 4.

Each of the address generator files listed in FIG. 4 has a general format 80 as indicated in FIG. 5, beginning with a header length count block 82 and followed by data frames 1-7. Of course the size of the field and the number of blocks depend upon the particular application and no limitation is meant.

Each data frame 1-7 in FIG. 5 contains instructions to configure the particular component contained in the reconfigurable address generator 22. Data frame 1 relates to the data source/destination control block. Data frame 2 relates to the boundary conditions detector/initiator block. Data frame 3 relates to the memory array pointer block, data frame 4 to the adders block, data frame 5 to the address generator parameter block, data frame 6 to the bank offset generator block, and data frame 7 to the memory timing control block.

Figure 6:
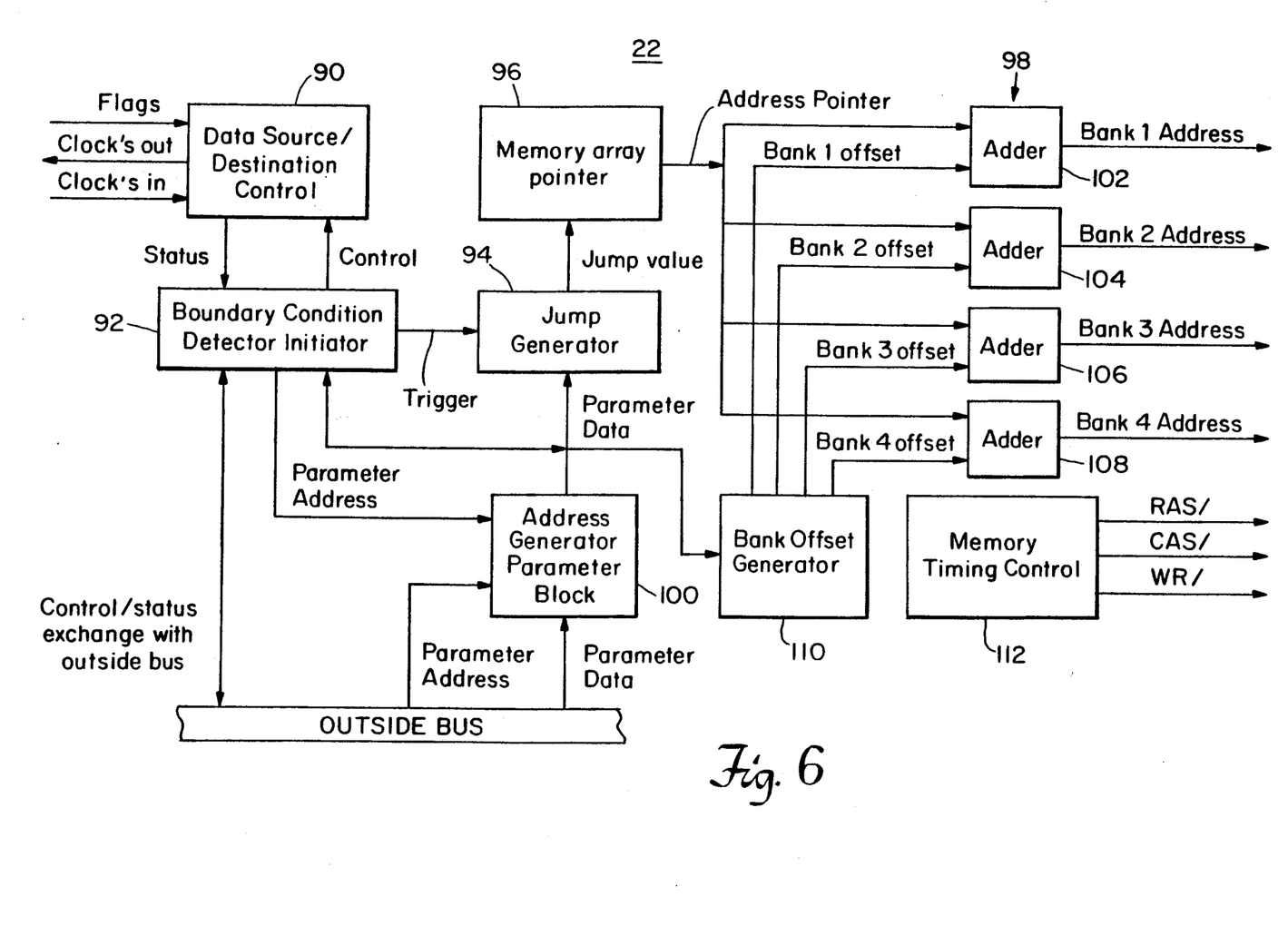
FIG. 6 is a more detailed block diagram of the address generator of FIG. 2.

All of these blocks are shown in FIG. 6 as constituting a general implementation of the address generator 22. Address generator 22 includes a data source destination control 90. Data source control 90, FIG. 6, sets the speed of the address generation and synchronizes it with the occurrence of the corresponding data. Boundary condition detector initiator 92 detects the beginning and the end or the boundaries of an image or a frame of data: it distinguishes the lines from one another and the group of lines creating a frame or image from the next frame or image. If there is a boundary condition detected by circuit 92, then jump generator 94 directs memory array pointer 96 to jump over the generated address to the new jump address. If a condition has been indicated by boundary condition detector initiator 92, a suitable line jump or frame jump increment is introduced. Otherwise the generated address is passed from the memory array pointer 96 to the adders 98. The magnitude of the jump introduced by jump generator 94 is determined by the address generator parameter block 100. Adders 98 may actually include four separate adders 102, 104, 106 and 108 as an example, which are offset an amount determined by bank offset generator 110, which permits the generation of four addresses from a single address pointer. This is done in certain types of filtering where a selected pixel must be convolved with a number of adjacent pixels. Memory timing control 112 indicates whether a write or read operation is currently being performed and identifies the correct time for the memory to strobe the addresses output from address 102, 104, 106 and 108. If the system is configured as an image acquisition address generator then the jump generator is eliminated since the data is likely stored sequentially and no jump is necessary. If the address generator is configured as a spatial filter then the data source destination control 90 may be eliminated, since the data is taken from the memory written back to it without any outside source or destination. When address generator 22 is performing a histogram operation the data source destination control 90 is again eliminated since the data is supplied from and returned to the memory directly, and the additional adders 104, 106 and 108 are also eliminated since in a histogram operation there is no need to provide multiple offset addresses from a single address. When address generator 22 is configured for image display operation, all of the adders as well as the bank offset generator may be eliminated since a simple image display does not require multiple address outputs.

Figure 7:
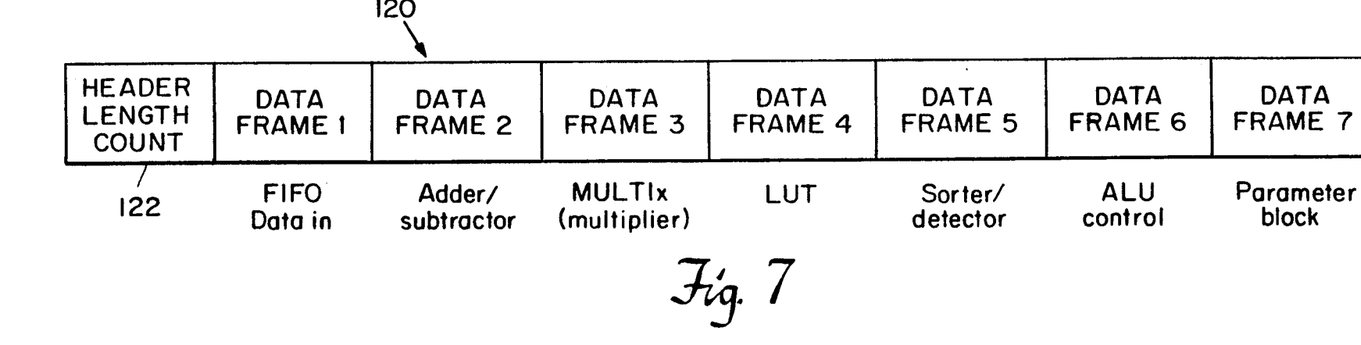
FIG. 7 is a diagram similar to that in FIG. 5 of the file structure for the arithmetic unit of FIG. 2.

The file format 120, FIG. 7, for the arithmetic unit 26 is the same as the file format 80 for the address generator 22, FIG. 5. Each data frame contains instructions to configure the particular component contained in the reconfigurable arithmetic unit 26. There is a header length count 122 followed by seven data frames. Data frame 1 contains the configuration instructions for the FIFO and data in blocks. Data frame 2 relates to the adder/subtractor block. Data frame 3 to the multiplier block, data frame 4 to the lookup table, data frame 5 to the sorter/detector, data frame 6 to the ALU control, and data frame 7 to the parameter block. All of these blocks are shown in FIG. 7 as constituting a general implementation of the arithmetic unit 26.

Figure 8:
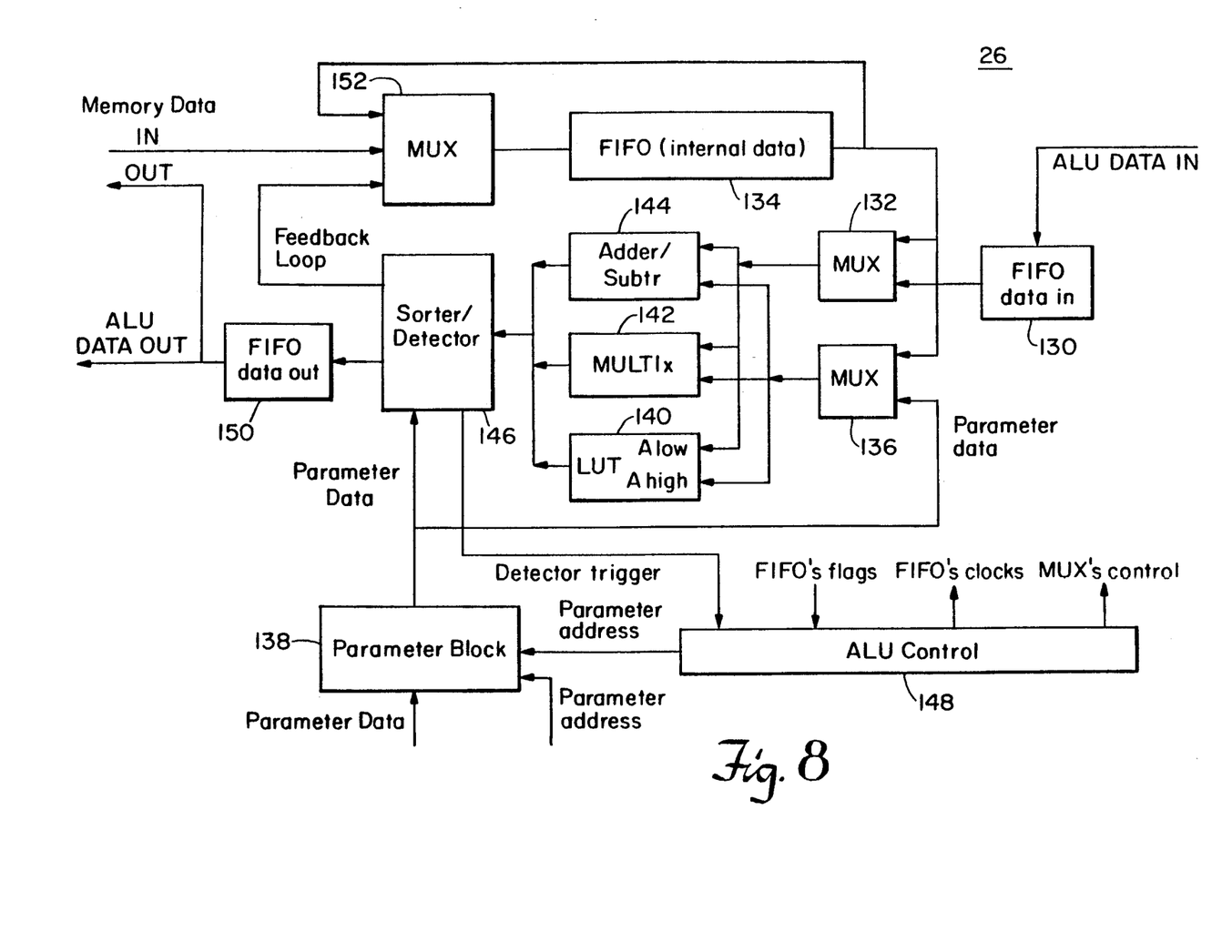
FIG. 8 is a more detailed block diagram of the arithmetic unit of FIG. 2.

A generalized block diagram of arithmetic unit 26, FIG. 8, includes a data-in FIFO 130 which receives external data and delivers it to a first multiplexer 132, which also receives internal data from internal data FIFO 134. A second multiplexer 136 also receives as an input the internal data from FIFO 134 as well as the output from parameter block 138. Parameter block 138 typically provides an identification of the particular table to be selected in lookup table 140, or the multiplying factor to be used in multiplier 142, or the offset to be used in adder/subtractor 144, as well as threshold levels for the detector/sorter circuit 146 and histogram operations. ALU control allows synchronization of data in FIFO 130, data-out FIFO 150, and the various multiplexers 132, 136 and 152, as well as internal data FIFO 134. Multiplexer 152 controls the input to internal data FIFO 134 from its own feedback loop, from memory data in, and from the detector/sorter 146 feedback loop.

In the image acquisition mode, arithmetic unit 26 requires only data-out FIFO 150, lookup table 140, and data-in FIFO 130, along with parameter block 138 and ALU control 148. The remainder of the circuits, all of the multiplexers, the internal data FIFO, adder/subtractor, and multiplier are necessary because an image acquisition system assembly taking in data from the external FIFO 130, may transform it using lookup table 140 and provide it at the output through data-out FIFO 150.

When arithmetic unit 26 is operating as a spatial filter, detector sorter 146 may be eliminated since the detecting and sorting required for histograms is not used in the spatial filtering in this application.

When arithmetic unit 26 is operating in the histogram mode, detector/sorter 146 is again necessary, but adder/subtractor 144, multiplier 142 multiplexers 132 and 136, and data-in FIFO 130, are eliminated since they are unnecessary in histogram operations. In histogram operations the data is compared and binned, and multiplying, adding and subtracting are typically not required functions. When arithmetic unit 26 is operating in the image display mode it requires only internal data FIFO 134, data output FIFO 150, lookup table 140, parameter block 138, and ALU control 148, since data is only coming in from the memory, is transformed by lookup table data 140 and is put out again to the display. The foregoing discussion of the generalized and more specific implementation of the address generator and arithmetic units to perform certain types of processing such as image display, histogram, spatial filtering and image acquisition, are for purposes of illustration only: the invention may be used for many other processing modes not limited to these, and may use processing techniques which differ from the specific implementations shown here as they form no part of the instant invention. Address generator 22 and arithmetic unit 26, FIGS. 2, 6 and 8, may be implemented with field programmable gate arrays available from XILINX Inc.

Previously, with respect to FIG. 2, it was explained that the address generator 22 and arithmetic unit 26 may be interconnected with the image data bank 24 by a number of buses in each case. If that is done, a pipeline approach of simultaneous processing of different sets of data according to different modes, e.g., image display, spatial filtering, histograms, may be accomplished. In addition, after each such cycle of processing the location of the different address sets and arithmetic circuits within the address generator and arithmetic unit, respectively, may be reshuffled to repeat the processing cycle with different data sets.

Figure 9:
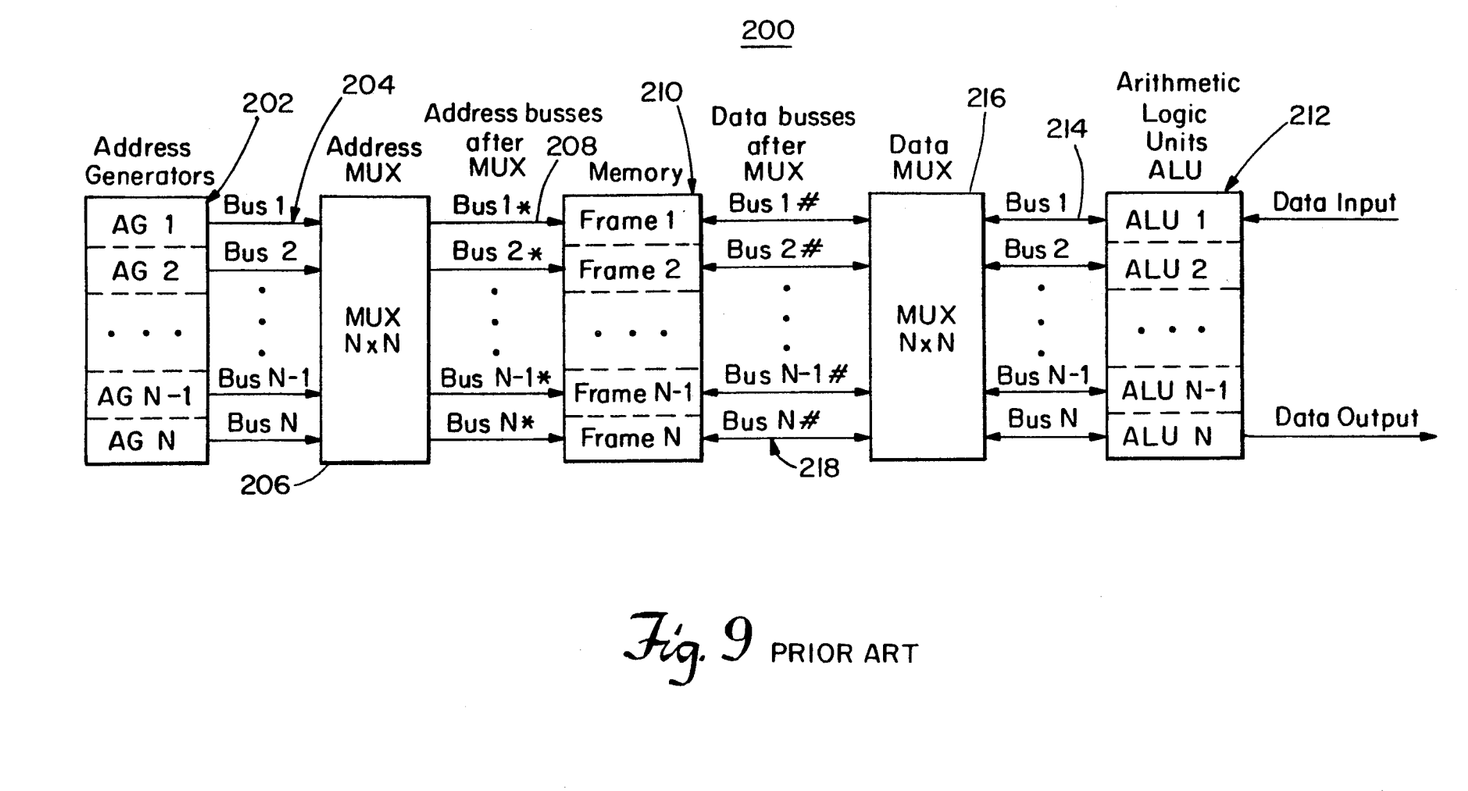
FIG. 9 is a block diagram of a prior art video image processing pipeline system.

In one prior art approach, FIG. 9, a partial attempt at this has been made. In a prior art video image processing pipeline system 200, FIG. 9, there are a plurality of fixed address generators 202, each of which communicates with a separate bus 204 via multiplier, mux, 206, and a second bus 208 to individual frames or sets of data in memory or data bank 210. Similarly, an arithmetic unit 212 including a plurality of fixed arithmetic circuits, is interconnected by a plurality of buses 214 through mux 216 and a second plurality of buses 218 to memory 210.

In operation, each of the address circuits in address generator 202 is permanently connected through a specific bus to the mux 206. Mux 206 then determines which of the incoming buses is to be connected to which of the outgoing buses so that each of the frames in memory 210 can be processed according to the address sequence in a different one of the address sets as the operation is recycled. Similarly, each of the arithmetic circuits 212 is connected to a specific dedicated bus 214, which mux 216 selectively interconnects with buses 218 in order to permit different frames in memory 210 to be processed by different arithmetic circuits during each cycle of operation. Although this system does accomplish a pipeline type of simultaneous processing without having to actually move the frames of data, it suffers from the shortcoming that it requires two complex multiplexers 206 and 216, each of which contains massive switching capability.

Figure 10:
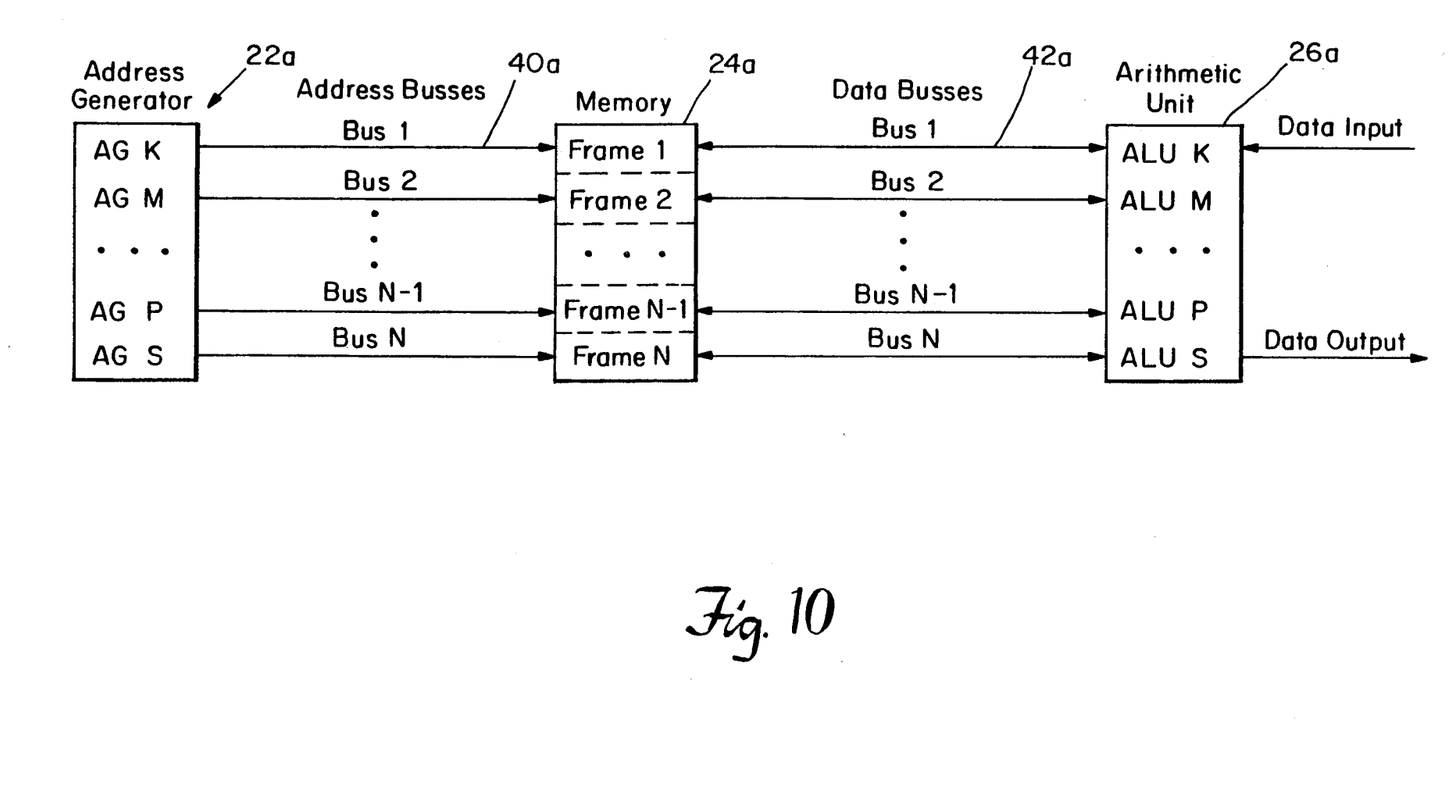
FIG. 10 is a block diagram of a video image processing pipeline system constructed in accordance with the reconfigurable sequential processor of this invention.

According to this invention, a much simpler and more hardware-efficient system can be constructed by providing an address generator 22a which includes a plurality of address sets each of which is connected by a different bus 40a to one of the data sets in image data bank 24a. Similarly, arithmetic unit 26a includes a plurality of arithmetic circuits which are interconnected with the data sets in image data bank 24a by means of a plurality of buses 42a. However, in accordance with this invention, no multiplexers are needed. For after a cycle of operation is completed, i.e., each frame has received the sequence of addresses from its associated address set in address generator 22a over the corresponding dedicated bus 40a and the pixel data has been processed in accordance with that address sequence by the associated arithmetic circuit in arithmetic unit 26a, the entire address generator can be reshuffled so that each of the address sets changes place and a similar reconfiguration can be accomplished with respect to the arithmetic circuits in arithmetic unit 26a. Thus the pipeline or parallel processing has been accomplished without moving the data sets and yet without requiring the complex and massive multiplexing capability of the prior art.

Although specific features of the invention are shown in some drawings and not others, this is for convenience only as each feature may be combined with any or all of the other features in accordance with the invention.

Other embodiments will occur to those skilled in the art and are within the following claims:

What is claimed is:

1. A reconfigurable sequential pipeline processor comprising:

a data bank for storing a plurality of data sets to be processed;

a programmable logic block address generator which includes a plurality of address sets for addressing data sets in said data bank;

a programmable logic block arithmetic unit, which includes a plurality of arithmetic circuit sets, responsive to said data bank, for processing the data sets addressed by said address sets in the programmable logic block address generator;

an address generator hardware configuration file having a plurality of configuration files for configuring each address set in said programmable logic block address generator in one of a plurality of addressing configurations in response to an address operational code;

an arithmetic unit hardware configuration file having a plurality of configuration files for configuring each arithmetic circuit set in said programmable logic block arithmetic unit in one of a plurality of processing configurations in response to an arithmetic operational code;

a plurality of buses for directly interconnecting in a permanent manner each of said plurality of reconfigurable address sets and arithmetic circuits with a specific one of said data sets;

means for delivering a series of operational codes to each of said address generator hardware configuration file and said arithmetic unit hardware configuration file for configuring said programmable logic block address generator sets and said programmable logic block arithmetic circuit sets to perform in parallel a corresponding series of arithmetic logic operations on said data sets in said data bank; and wherein said means provides a reconfigurable sequential processor without the need for a hardware multiplexer switching capability.

2. The reconfigurable sequential processor of claim 1 in which said programmable logic block address generator and said programmable logic block arithmetic unit are programmable gate arrays.

3. The reconfigurable sequential processor of claim 1 in which said means for delivering said operational codes includes an operational code register for storing the operational code of the next configuration for each address set in said programmable logic block address generator and each arithmetic circuit set in said programmable logic block arithmetic unit, and decoder means, responsive to said operational code of the next configuration for selecting from said hardware configuration files the file corresponding to said operational code.

4. The reconfigurable sequential processor of claim 1 in which said means for delivering said series of operational codes for configuring said programmable logic block address generator includes a plurality of reconfigurable address sets.

5. The reconfigurable sequential processor of claim 1 in which said means for delivering said series of operational codes for configuring said programmable logic block arithmetic unit includes a plurality of reconfigurable arithmetic circuits.

* * * * *